Dec. 8, 1925.                                                                1,564,848
W. J. HERSCHEDE ET AL
PROCESS FOR FORMING AND APPLYING BENT VENEER WORK
Filed July 19, 1923

Inventor
WALTER J. HERSCHEDE
WALTER EBERHARDT.

By Walter F. Murray

Attorney

Patented Dec. 8, 1925.

1,564,848

UNITED STATES PATENT OFFICE.

WALTER J. HERSCHEDE AND WALTER EBERHARDT. OF CINCINNATI, OHIO, ASSIGNORS TO THE HERSCHEDE HALL CLOCK COMPANY, OF CINCINNATI, OHIO, A CORPORATION OF OHIO.

PROCESS FOR FORMING AND APPLYING BENT-VENEER WORK.

Application filed July 19, 1923. Serial No. 652,490.

*To all whom it may concern:*

Be it known that we, WALTER J. HERSCHEDE and WALTER EBERHARDT, citizens of the United States of America, and residents of Cincinnati, in the county of Hamilton and State of Ohio, have invented a new and useful Improvement in a Process for Forming and Applying Bent-Veneer Work, of which the following is a specification.

Heretofore when it was desired to make cabinet work in which laminated veneering was used for curved and bent portions, it was customary to first treat the veneering in a usual manner to make it pliable, then coat the several layers with glue, place the same in a mold and allow to dry. This drying process required many hours before the curved portions were ready to be assembled with the panels of the cabinet work. Our invention is for use primarily in the cabinet work for fine clocks, although it may be utilized for any other work of the same nature as will be readily observed.

An object of our invention is to provide a process whereby a great saving of time may be effected.

Another object is to form and assemble cabinet at one operation.

Another object is to provide a process for accomplishing these objects that will be simple and effective.

These and other objects are attained in the manner and by the means described herein and disclosed in the accompanying drawings, in which.

Figure 1:
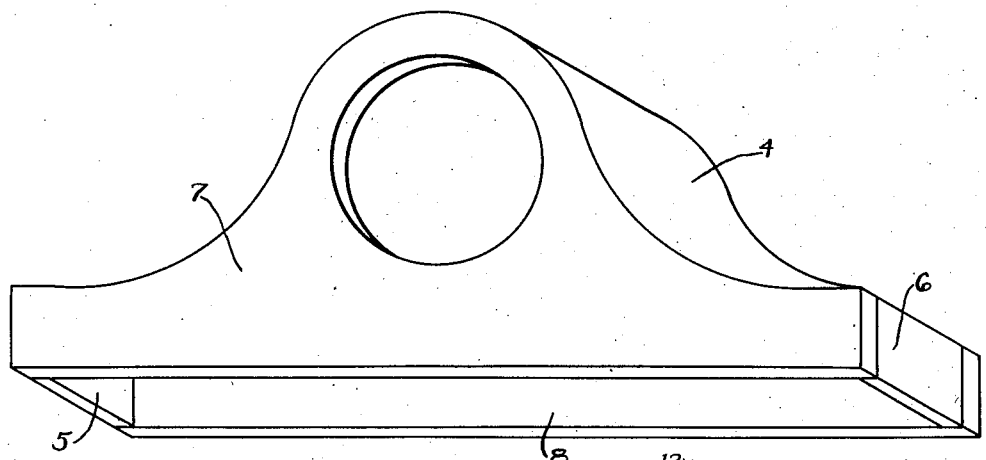
Fig. 1 represents a clock cabinet of the bent-wood type made in accordance with our process.
Figure 3:
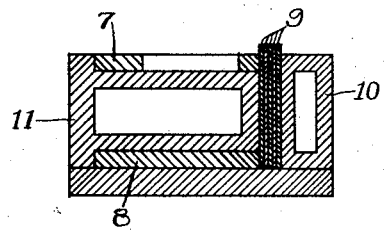
Fig. 3 is a cross sectional view on line 3—3 of Fig. 2.
Figure 2:
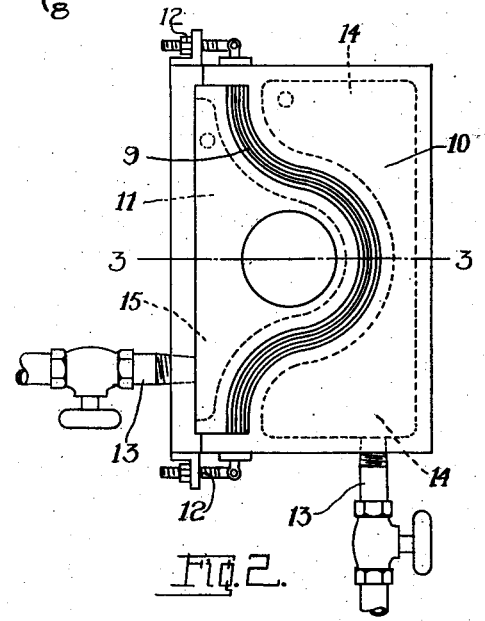
Fig. 2 is a plan view of a mold of a type utilized in carrying out our invention and showing in process of assembly, a cabinet as shown in Fig. 1.

In this process we employ a mold somewhat like those usually used for this type of work, except that the mold will accommodate the entire cabinet and that each part or member of the mold has chambers and connected with these chambers are pipes which are hereafter more fully set forth. The clock cabinet to be made in this instance is shown in Fig. 1 and comprises a curved top piece 4 and ends 5 and 6, a front 7 and a back 8. The curved top 4 is made of a number of pieces of thin veneer 9. The various parts just mentioned are cut to dimensions for joining and glue applied to the joints. The sheets of dry veneer are positioned in the usual manner and glue applied. The dry sheets of glue covered veneer are then placed in the mold 10 which has the form of the outside of the cabinet to be made, the front 7, back 8 and ends 5 and 6 then being placed in position in the mold and the complementary portion of the mold 11 is then inserted into position and clamped. The mold 11 is formed to correspond with the inside of the cabinet. The pipes 13 are connected with the molds 10 and 11 at one end, the other ends being adapted to communicate with a source of heat and also with a source of a cooling medium. After the material has been positioned and clamped in the mold the two mold members 10 and 11 are heated. After the mold members become heated the clamps 12, which may be of any desired form are tightened. The veneer and glue yield very readily to the heat and the glue seeps well into the pores of the grain of the wood in a very short time. The work is chilled and firmly sets the glue after which the work may be immediately removed from the mold. The whole process requires but a small fraction of the time formerly required to form the top part of the cabinet alone.

What we claim is:

1. The process of forming cabinets and the like having laminated curved portions comprising applying a bonding substance to the laminations and to the joints of the cabinet to be formed, placing the component parts in position between a pair of complementary molds, clamping and heating the molds sufficiently to permit the bonding substance to permeate the pores of the wood and then chilling the molds thereby causing the bonding substance to set whereupon the cabinet may be removed from the molds completely assembled.

2. The process of forming cabinets and the like having sides, ends and curved laminated veneer tops, comprising applying a bonding substance to the joints of the sides and ends and to the laminations of veneer, placing the sides, ends, and top thus treated in position between a pair of complementary molds, clamping and heating the molds sufficiently to permit the bonding substance to permeate the pores of the wood and then chilling the molds thereby causing the bonding substance to set whereupon the cabinet may be removed from the molds completely assembled.

In testimony whereof, we have hereunto subscribed our names this 11th day of July, 1923.

WALTER J. HERSCHEDE.
WALTER EBERHARDT.